United States Patent Office 3,597,233
Patented Aug. 3, 1971

3,597,233
NON-FAT TOPPING COMPOSITIONS
Bernard A. Patterson, 4040 N. LeClaire Ave.,
Chicago, Ill. 60614
No Drawing. Filed Feb. 13, 1969, Ser. No. 799,091
Int. Cl. A23l *1/00, 1/14*
U.S. Cl. 99—139                              5 Claims

ABSTRACT OF THE DISCLOSURE

A temperature stable, non-fat emulsion having improved whipping properties and comprising a mixture of a sugar, a non-ionic emulsifying composition containing a glyceride ester in which at least 90% of the ester groups present are long chain monoester groups with a polyoxyethylene sorbitan stearate.

BACKGROUND OF THE INVENTION

Field of the invention

This invention is in the field of edible, whippable toppings of the non-fat type which are temperature stable, do not require chilling or thawing, and produce a whipped product of exceptionally high yield.

DESCRIPTION OF THE PRIOR ART

Whippable compositions which are fairly stable and which contain substantial amounts of fat are well known commercially and are described in such patents as Diamond et al. Pat. No. 2,868,653 and in my own previous U.S. Pat. No. 3,383,219.

Commercially available fat-type toppings usually yield an increase in volume to the extent of about 300 to 400% when chilled and whipped. At ambient temperatures, such whips may be held for about two to three hours. When placed under refrigeration, they may be stable for as long as two weeks.

Some attempts have been made to employ various proteinaceous materials to stabilize non-fat whipping compositions. Among these materials are soy, albumen, calcium and sodium caseinates and egg albumens. While these materials sometimes provide high yields, they are relatively unstable and tend to exude moisture or "weep." Commercial non-fat dry toppings have a yield of about 300 to 400% when freshly whipped, and they may hold up for about three to four hours at ambient temperatures. Under refrigeration, they may last for about twenty-four hours or so.

SUMMARY OF THE INVENTION

The present invention provides an improved non-fat topping which when whipped yields from 800 to 1200%, and holds up effectively for six to eight hours at ambient temperatures. When refrigerated, the composition will stand up for as much as two weeks and, when frozen will stand up indefinitely.

In summary, this invention provides a non-fat composition which is temperature stable and which includes a mixture of from about 25 to 40% by weight of sugar in combination with from 0.5 to 2% by weight of a non-ionic emulsifier. The latter preferably consists of a mixture of a glyceride ester in which at least 90% of the ester groups present are monoester groups containing from 10 to 24 carbon atoms and a polyoxyethylene stearate. In order to provide adequate physical properties, it is preferable to add an edible bodying agent and to maintain the pH of the resulting composition at no more than 7. As is typical with non-fat emulsions, the emulsion of the present invention also contains about 0.2 to 1.0% salt, with the balance being essentially water.

DESCRIPTION OF THE PREFERRED EMBODIMENTS

The compositions of the present invention may use any type of natural sugar including sucrose, dextrose, lactose, fructose, corn sugar or the like. In the case of dietetic foods, a portion of the natural sugar content may be substituted by organic sweetening agents such as sodium or calcium cyclamate.

The non-ionic emulsifier composition contains a glyceride ester in which at least 90% of the ester groups present are monoesters. Such compositions are available commercially under the trademark "Myverol" Types 18–07 and 18–00. While these monoglyceride esters have been suggested for inclusion into food products, they suffer from the defect that they are quite temperature sensitive when used alone. To overcome this drawback, I combine the highly hydrophilic monoesters with a non-ionic emulsifying agent. The non-ionic emulsifying agent is preferably a polyoxyethylene sorbitan stearate, and could be the monostearate or the tristearate, or mixtures of the two. The polyoxyethylene groups in each molecule typically average about 20 but may be from about 15 to 25. These materials are available commercially as "Tween 60" and "Tween 65." The combination of monoester and non-ionic emulsifying agent should include about 40 to 60% of the monoester and 60 to 40% of the non-ionic emulsifier for best results.

As the bodying agent, I prefer to use calcium gluconate or sodium acid pyrophosphate in an amount of from 1 to 2% by weight of the entire mixture. Other edible salts can also be employed, including alkali metal and calcium phosphates.

The compositions of the present invention also may include from 0.2 to 1.0% salt, with the balance being essentially water. Of course, various proteinaceous bodying agents such as albumen, sodium and calcium caseinate, starch and denatured callagen can all be added in amounts ranging from about 1 to 2% although they are usually not necessary. Flavoring and coloring agents can also be employed as desired.

The present invention provides a liquid whippable emulsion which can withstand temperatures above 300° F., thereby making it possible to package the emulsion in a sterile form. The compositions of the present invention are useful not only as topping materials but can be used in conjunction with fruits, juices, and other non-fat food items in the production of desserts, puddings, and confections.

The following specific examples illustrate some of the preferred compositions coming within the scope of the present invention.

EXAMPLE 1

Non-fat topping

| | Parts by weight |
|---|---|
| Sucrose | 37.70 |
| Calcium gluconate | 0.60 |
| Sodium chloride | 0.20 |
| Coloring agents | 0.20 |
| Emulsifiers (50% "Myverol 18–07" 50% "Tween 60") | 1.20 |
| Water | 60.00 |
| | 100.00 |

EXAMPLE 2

Non-fat topping

| | Parts by weight |
|---|---|
| Sucrose | 25.00 |
| Dextrose | 12.90 |
| Sodium hexametaphosphate | 0.60 |
| Salt | 0.30 |
| Coloring agents | 0.20 |
| Emulsifiers (45% "Myverol 18–07" 55% "Tween 65") | 1.00 |
| Water | 60.00 |
| | 100.00 |

The following is an example of a dietetic whip which can be produced according to the present invention:

| | Parts by weight |
|---|---|
| Lactose and calcium or sodium cyclamate | 37.90 |
| Sodium phosphate | 0.60 |
| Salt | 0.30 |
| Coloring agents | 0.20 |
| Emulsifying agents (55% "Myverol 18–07" 45% "Tween 60") | 1.00 |
| Water | 60.00 |
| | 100.00 |

It should be understood that the relative amount of water and solids may vary depending upon the ultimate product.

The blending of the dry ingredients is important to obtain the best results. In the manufacture of the non-fat emulsion, the first step is to blend the emulsifiers and water at temperatures below 180° F. with agitation until the emulsifiers are thoroughly blended. The other dry ingredients are then added and agitation is continued until all of the ingredients are completely dissolved or suspended, and a temperature of 120° F. to 160° F. is maintained. The combined blend is then put through a homogenizer of the ram type. In the first stage of the homogenizer, the pressure is maintained at about 500 pounds per square inch. Finally, the homogenized liquids are put through heat exchangers and pumped into a sterilizing tower where they are brought to temperatures of 280° F. to 300° F.

The compositions of the present invention can be aseptically sterilized, canned, and maintained at room temperatures from 32° F. to 120° F. without breakdown of the emulsion.

The compositions of the present invention are stable in changing from high temperatures to low temperatures during storage. It is also possible to freeze the emulsions at 32° F. or so, and then reheat the same without a breakdown of the emulsion, a characteristic which is unusual in this type of product.

It should be evident that various modifications can be made to the described embodiments without departing from the scope of the present invention.

I claim:

1. A non-fat temperature stable emulsion of improved whipping properties comprising a mixture of from
   (1) 25 to 40% by weight sugar;
   (2) from 0.5 to 2% by weight of a nonionic emulsifier consisting of a mixture of
      (a) from 40 to 60 parts of a glyceride ester in which at least 90% of the ester groups present are monoester groups containing from 10 to 24 carbon atoms, and
      (b) from 60 to 40 parts of a polyoxyethylene sorbitan stearate containing from 15 to 25 oxyethylene groups;
   (3) an edible salt bodying sugar agent in an amount up to 2%;
   (4) from 0.2 to 1.0% salt, and
   (5) the balance essentially water.
2. The emulsion of claim 1 in which (b) is a polyoxyethylene sorbitan stearate having about 20 oxyethylene groups in its molecule.
3. The emulsion of claim 1 in which said bodying agent is calcium gluconate.
4. The emulsion of claim 3 in which said calcium gluconate is present in an amount of from 1 to 2% by weight of the mixture.
5. The emulsion of claim 1 which also includes a proteinaceous bodying agent, in an amount from about 1% to 2% by weight of the mixture.

References Cited

UNITED STATES PATENTS

| 3,190,757 | 6/1965 | Underwood et al. | 99—139 |
| 3,431,117 | 3/1969 | Lorant | 99—139 |

RAYMOND N. JONES, Primary Examiner

J. M. HUNTER, Assistant Examiner

UNITED STATES PATENT OFFICE
CERTIFICATE OF CORRECTION

Patent No. 3,597,233            Dated August 3, 1971

Inventor(s) Bernard A. Patterson

It is certified that error appears in the above-identified patent and that said Letters Patent are hereby corrected as shown below:

Column 4, line 23, after "bodying" cancel "sugar".

Signed and sealed this 7th day of March 1972.

(SEAL)
Attest:

EDWARD M. FLETCHER, JR.
Attesting Officer

ROBERT GOTTSCHALK
Commissioner of Patents